(12) United States Patent
Naka

(10) Patent No.: US 6,952,285 B1
(45) Date of Patent: Oct. 4, 2005

(54) IMAGE READING DEVICE THAT ADJUSTS FOR WEAKENING OF SCANNER ELEMENTS OVER TIME

(75) Inventor: Takafumi Naka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 744 days.

(21) Appl. No.: 09/670,012

(22) Filed: Sep. 26, 2000

(30) Foreign Application Priority Data

Sep. 27, 1999 (JP) .................................. 11-272052

(51) Int. Cl.⁷ ............................ H04N 1/46; G06F 15/00
(52) U.S. Cl. ....................... 358/1.9; 358/500; 358/505; 358/518; 382/169
(58) Field of Search .......................... 358/1.3, 1.5, 1.6, 358/1.8, 1.12, 505, 523, 534, 519, 521, 1.9, 358/500; 400/120.1, 118.3, 120.12; 382/167, 382/169

(56) References Cited

U.S. PATENT DOCUMENTS

| | | | |
|---|---|---|---|
| 4,991,116 A | * | 2/1991 | Hohner .......................... 358/1.6 |
| 5,479,585 A | * | 12/1995 | Komagine .................... 358/1.3 |
| 5,652,412 A | * | 7/1997 | Lazzouni et al. ........ 178/18.01 |
| 5,721,626 A | * | 2/1998 | Kimura ....................... 358/482 |
| 5,796,865 A | * | 8/1998 | Aoyama et al. ............. 382/169 |
| 6,115,136 A | * | 9/2000 | Tsukamoto et al. ........ 358/1.18 |
| 6,115,150 A | * | 9/2000 | Nakamura et al. .......... 358/521 |

* cited by examiner

Primary Examiner—Thomas D. Lee
Assistant Examiner—James A. Thompson
(74) Attorney, Agent, or Firm—Oliff & Berridge, PLC

(57) ABSTRACT

A reference image signal level curve V1 and a predetermined coefficient are provisionally stored in a ROM of a main controller. The predetermined coefficient provides a threshold level curve by multiplying by the curve V1. A white color image signal level curve V2 is formed upon reading a white reference surface by optical sensors. The white color image signal level curve V2 is compared with the reference image signal curve V1. If at least a part of the curve V2 is not coincident with at least a part of the curve V1, the curve V1 is multiplied by $\Delta V$ percent, and this percentage is stored in a RAM. These are performed repeatedly until a part of the curve V2 is coincident with a part of the curve V1 as a result of increase in cumulative $\Delta V$ percent. Thus, a correction coefficient K is determined based on the cumulative $\Delta V$ percent to provide a corrected image signal level curve. The corrected image signal level curve is compared with the threshold level curve to obtain a binary image data.

13 Claims, 5 Drawing Sheets

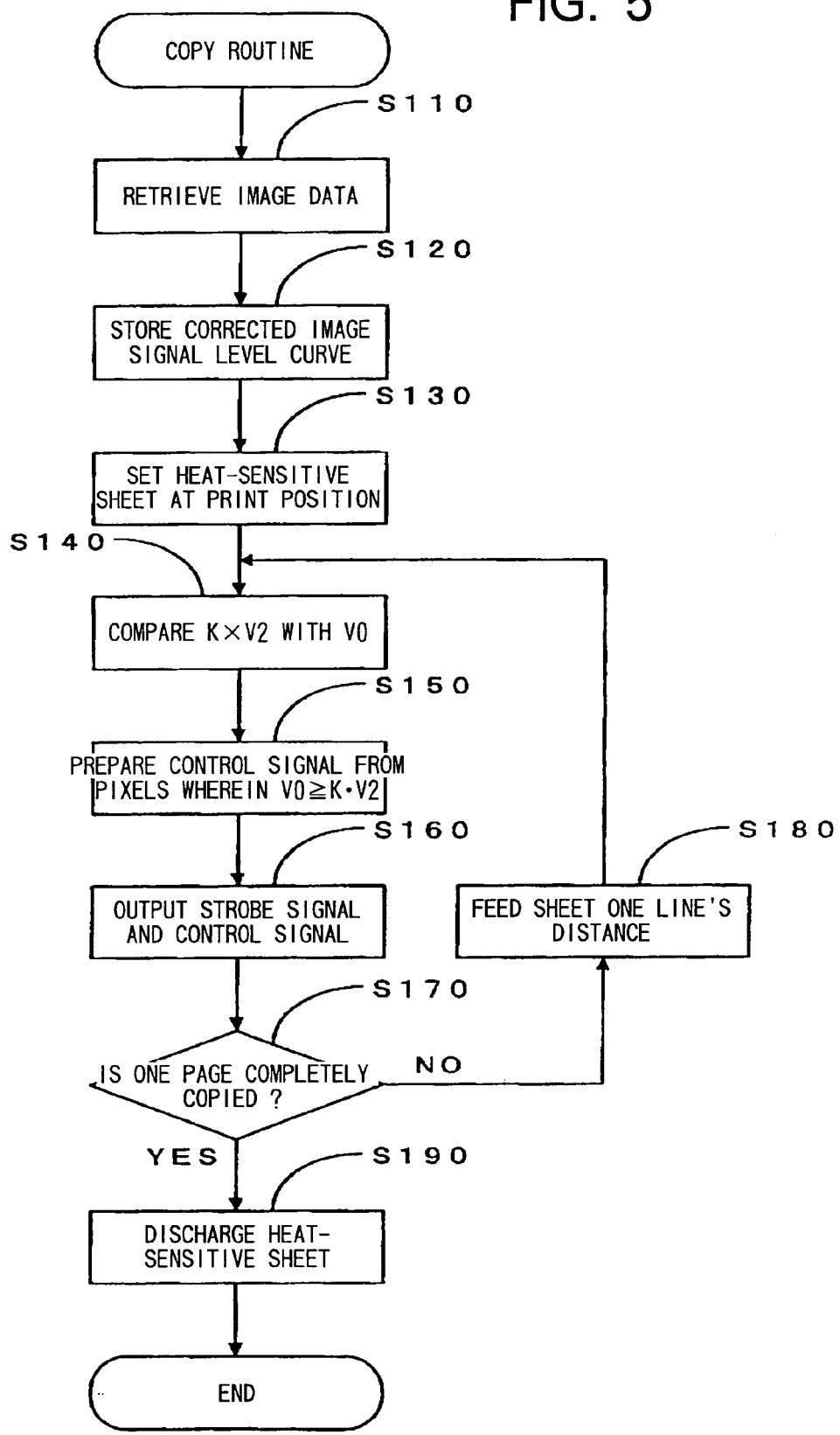

IMAGE READING DEVICE THAT ADJUSTS FOR WEAKENING OF SCANNER ELEMENTS OVER TIME

BACKGROUND OF THE INVENTION

The present invention relates to an image reading device that adjusts for weakening of scanner elements over time. The present invention also relates to a method for formulating a level of image signals, and to an electronic board which performs the image signal level formulating method and is provided with the image reading device.

There has been known an image reading device for use in an electronic whiteboard. The image reading device includes a scanner and a comparator. The scanner includes a plurality of sensor elements aligned in a single row for optically reading the image on the board. The optical sensors pick up an image and output an image signal accordingly. The comparator compares the image signal from the sensor elements with a predetermined threshold value to produce binary data of the image signal. That is, the comparator judges a pixel to be white or black based on the threshold value.

There is variance in the sensitivity of the optical sensors of the scanner. To adjust for this variance, a reference image signal level curve V1 and a threshold level curve V0 shown in FIG. 1($a$) are prepared before shipping the image reading device from the factory, and prestored in a memory unit of the image reading device as the characteristic of the image reading device.

That is, at the factory the scanner of the image reading device is used to scan a predetermined white color reference member. The obtained image signal is corrected to match its peak value with a maximum value Vmax, which is the maximum value established for the readable range of the image reading device. The corrected image signal is stored in the memory unit as the reference image signal level curve V1. Then, the threshold level curve V0, which is used to convert a signal of a read out image into binary image data as described above, is determined based on the image signal level curve V1. That is, the image signal level curve V1 is multiplied times a predetermined coefficient to produce the threshold level curve V0. The threshold level curve V0 is also stored in the memory unit. Later, when the image reading device is actually used to read images, the actual image signal level curve is compared with the threshold level curve V0 to produce an output of binary image data.

However, the scanner of this conventional image reading device can degrade over time and/or for other reasons, so that the scanner outputs an image signal level smaller than the image signal level measured at the factory. However, because the weaker image signal is compared with the same threshold level curve V0 to produce binary data, more pixels will be judged as being black, resulting in an overall darkening of images printed out based on the binary data.

Therefore, adjustments must be made before the scanner is used to correctly read images, in order to increase the image signal level as appropriate for the threshold level curve V0. For the adjustment, the scanner is used to scan a white reference surface disposed at the image reading position of the device, to read an image signal level curve V2 shown in FIG. 1($b$). Then, the image signal level is adjusted so that a maximum value V2max of the image signal level curve V2 matches the above-described maximum value Vmax, to produce a corrected image level curve V2$_{corrected}$ as shown in FIG. 1($c$). After the adjustment of the image signal level, the image reading device is actually used to read images, and the actual image signal level curve is compared with the already stored threshold level curve V0 to produce an output of binary image data.

However, the white reference surface disposed at the image reading position of the scanner can be stained or soiled. This is particularly common with electronic whiteboard that are written on using a felt-tipped marker, because the ink from the felt-tipped marker is often not completely erased from the white reference surface. In this case, the stained area will affect the image signal level curve. As shown in FIG. 1($b$) the entire shape of the image signal level curve V2 will be different from the entire shape of the reference image signal level curve V1. (In FIG. 1($b$), a curve V1' is an imaginary curve provided that no stain portion is provided in the whiteboard but the signal level are entirely weakened as a result of degradation.) That is, the signal level are lowered at the stained area of the whiteboard.

With this state, if the curve V2 is modified so that the maximum value V2max of the image signal level curve V2 matches the above-described maximum value Vmax as shown in FIG. 1($c$), a broken line curve V3 in FIG. 1($c$) which corresponds to the broken line curve V1' exceeds the maximum readable range Vmax.

In the factory before shipping, assuming that there is a black color area in a whiteboard, and a black dot is shown as an image signal level. This black dot is located below the threshold level curve V0 as shown in FIG. 1($a$), so that the determination falls within a black color range. On the other hand, after the above-described adjustment, the black dot is positioned above the threshold level curve V0 as shown in FIG. 1($c$) due to excessive adjustment of the image signal level, so that the determination falls within a white color range. In summary, due to the excessive adjustment, the read image data may produce an entirely white or pale image in comparison with the actual image drawn on the whiteboard.

SUMMARY OF THE INVENTION

It is an object of the present invention to provide an image reading device capable of properly correcting the image signal level curve even when a portion of the white reference member disposed at the image reading position is stained.

Another object of the present invention is to provide an electronic board provided with the image reading device capable of properly correcting the image signal level curve even when a portion of the white reference member disposed at the image reading position is stained.

Still another object of the invention is to provide a method for formulating a level of image signals capable of providing a shape of the reference image signal level curve even after degradation of the image sensor elements and irrespective of a stained area in a reference white surface.

These and other objects of the present invention will be attained by an image reading device including an image reading unit, a characteristic storage unit, a correction coefficient calculator and a correction output unit. The image reading unit includes a plurality of optical reading sensors aligned in a row. The image reading unit outputs an image signal based on an image read by the plurality of optical reading sensors. The characteristic storage unit stores the characteristic of the image reading unit in the form of a reference image signal level curve and one of a predetermined coefficient and a threshold level curve. The reference image signal level curve is obtained by correcting an image signal curve outputted by the reading unit when the optical reading sensors reads an image of a predetermined white reference member at a factory so that a peak value of the image signal curve matches a predetermined maximum readable range. The threshold level curve is obtained by multiplying the reference image signal level curve by the predetermined coefficient. The correction coefficient calculator determines a correction coefficient which provides a part of the present image signal level curve being matched with a part of the reference signal level curve to produce a corrected image signal level curve. The correction output unit produces a binary output signal of the corrected image signal level curve by comparing the corrected image signal level curve with either the threshold level curve stored in the characteristic storage unit or a threshold level curve obtained by multiplying the reference image signal level curve by the predetermined coefficient.

The correction coefficient calculator includes reading means, comparing means, and determining means. The reading means reads an image from a white reference surface provided at a reading position to obtain a present image signal level curve before image data is actually retrieved using the reading unit. The comparing means compares the present image signal level curve with the reference image signal level curve stored in the characteristic storage unit. The determining means determines a correction coefficient required to match at least the portion of the present image signal level curve with the portion of the reference signal level curve.

The white reference surface positioned at the reading position of the image reading device may be partially soiled, so that the image signal level curve actually outputted differs from the reference image signal level curve already stored at the factory. In such a situation, a correction coefficient is determined that is required to match at least a portion of the actual image signal level curve with the reference image signal level curve. Therefore, a correction coefficient is determined for matching the image signal level obtained at non-soiled portions with the reference image signal level curve. In other words, because a portion of the actual image signal level curve, the portion corresponding to the soiled portion, has a shape different from the reference image signal level curve, such portion does not match the reference image signal level curve. An actual signal level curve is obtained by multiplying with the correction coefficient. The actual signal level curve becomes the image signal level curve with a shape that corresponds to the reference image signal level curve, regardless of the presence or absence of dirty areas on the white reference surface.

In another aspect of the invention, there is provided an electronic board including a white board on which an image is drawn, the image reading unit, the characteristic storage unit, the correction coefficient calculator, the correction output unit, and printing means that prints an image on an image recording medium based on the binary output signal.

In still another aspect of the invention, there is provided a method for formulating a level of image signal including the steps of provisionally storing a characteristic of a image reading unit in the form of a reference image signal level curve and one of a predetermined coefficient and a threshold level curve, the reference image signal level curve being obtained by correcting an image signal curve outputted by the reading unit when the reading unit reads an image of a predetermined white reference member at a factory so that a peak value of the image signal curve matches a predetermined maximum readable range, and the threshold level curve being obtained by multiplying the reference image signal level curve by the predetermined coefficient, determining a correction coefficient providing a part of a present image signal level curve being matched with a part of the reference signal level curve to produce a corrected image signal level curve, and generating a binary output signal of the corrected image signal level curve by comparing the corrected image signal level curve with either the threshold level curve stored in the characteristic storage unit or a threshold level curve obtained by multiplying the reference image signal level curve by the predetermined coefficient.

BRIEF DESCRIPTION OF THE DRAWINGS

In the drawings:

FIG. 1($b$) is a graph schematically showing an image signal level curve V2 obtained by reading the image of a white reference member where a stain area partly exists for adjusting output of attenuated sensor elements of the conventional image reading device;

FIG. 1($c$) is a graph schematically showing an excessively corrected image level curve $V2_{corrected}$ resulting from a stain on the white reference member for adjusting output of attenuated sensor elements of the conventional image reading device;

FIG. 4($b$) is a graph schematically showing an image signal level curve V2 obtained by reading the image of a white reference member, for adjusting output of attenuated retrieval elements of the image reading device shown in FIG. 2;

FIG. 4($c$) is a graph schematically showing the image signal level curve V2 of FIG. 4($b$) after being corrected according to the routine represented by the flowchart of FIG. 3; and FIG. 5 is a flowchart representing a copy routine performed in the image reading device shown in FIG. 2.

DETAILED DESCRIPTION OF THE PREFERRED EMBODIMENT

Figure 1:
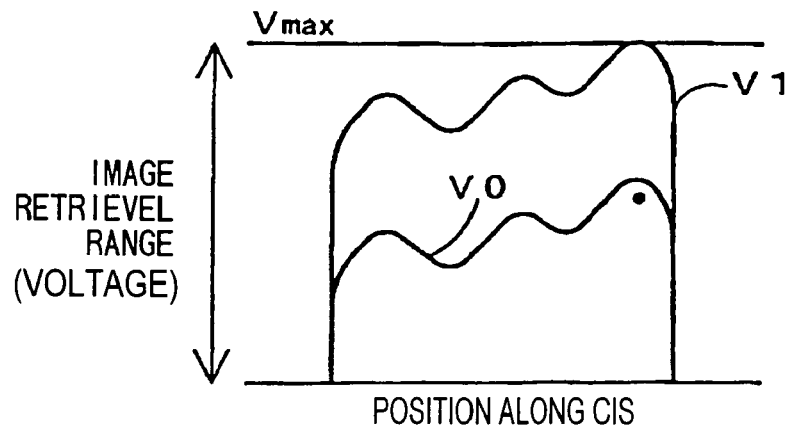
FIG. 1($a$) is a graph schematically showing a reference image signal level curve V1 and a threshold level curve V0, which serve as the characteristic of a conventional image reading device.
Figure 1:
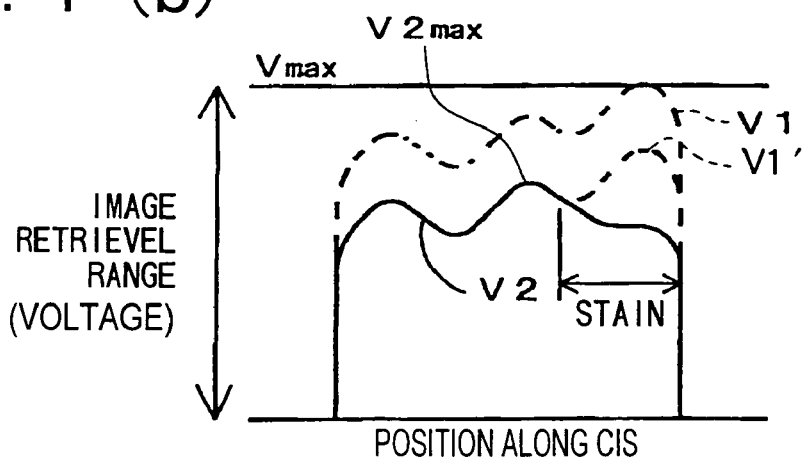
Figure 1:
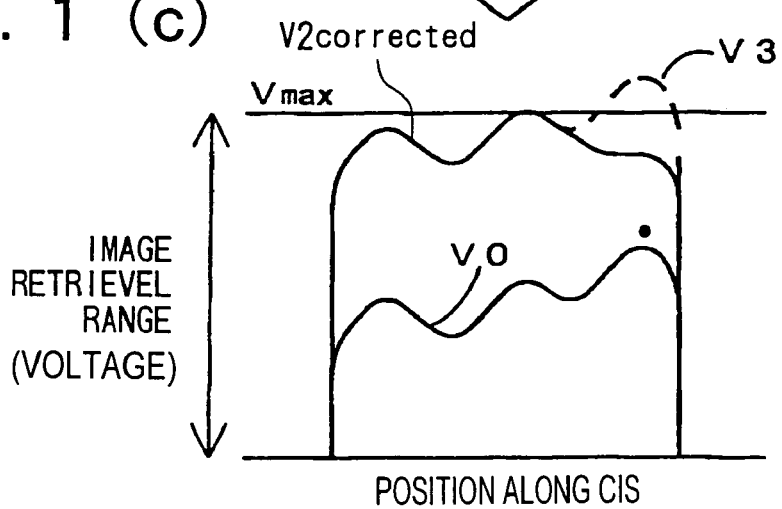
Figure 2:
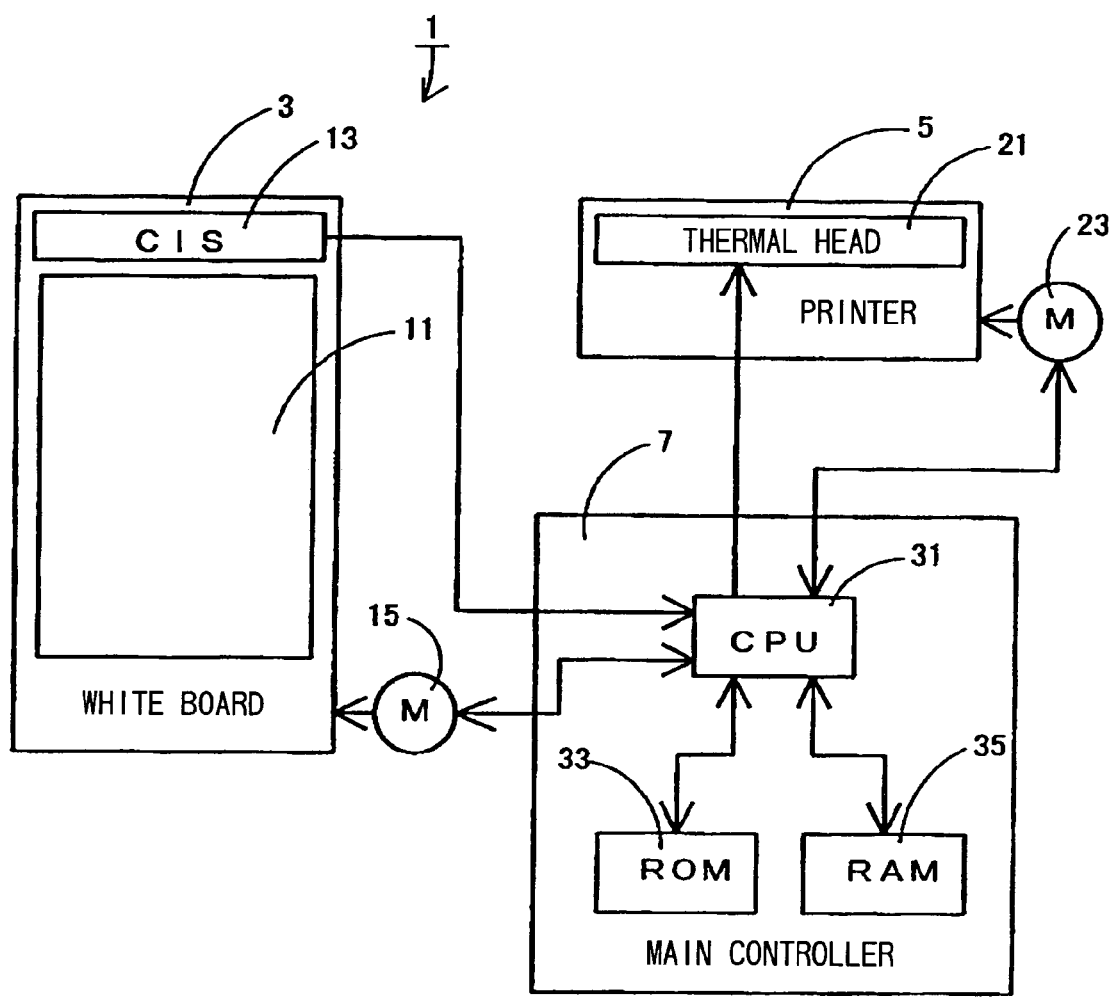
FIG. 2 is a block diagram showing an electronic board provided with an image reading device according to an embodiment of the present invention.

An electronic board according to an embodiment of the present invention will be described with reference to FIGS. 2 to 5. As shown in FIG. 2, the electronic board 1 includes a whiteboard 3, a thermal printer 5, and a main controller 7. The main controller 7 controls the whiteboard 3 and the thermal printer 5 in a manner to be described below.

The whiteboard 3 includes a sheet member 11 on which figures and characters are drawn, upper and lower rollers (not shown) for supporting the sheet member 11, a sheet member feed motor 15 for feeding the sheet member 11 upward and downward, and a contact image sensor (CIS) 13 for reading figure and character images drawn on the sheet member 11 and outputting image data signals accordingly. The sheet member 11 is in the form of an endless web with confronting front and rear sides. The thermal printer 5 includes a thermal head 21 with a plurality of heat generating elements, and a sheet feed motor 23 for feeding the heat-sensitive sheet. The main controller 7 includes a central processing unit (CPU) 31, a read only memory (ROM) 33, and a random access memory (RAM) 35.

The CIS 13 includes a plurality of light-receiving elements aligned in the widthwise direction of the sheet member 11, red LEDs and green LEDs. The CIS 13 can read figures and characters drawn on the sheet 11 in either black or red marker. That is, the CIS 13 reads black figures and characters by illuminating the red LEDs and reads black and red figures and characters by illuminating the green LEDs.

The heat-sensitive sheet set in the thermal printer 5 is coated on its surface with two heat-sensitive ink layers. The first ink layer turns red at a first temperature, and the second ink layer turns black at a second temperature lower than the first temperature. The plurality of heat generating elements of the thermal head 21 are aligned in the widthwise direction of the heat-sensitive sheet. These heat generating elements are controlled to be driven upon low level strobe signal from the CPU 31. Image data retrieved by the CIS 13 and stored in the RAM 35 is outputted in one line basis at a time from the RAM 35. Based on the one line image data, the thermal head 21 is controlled by the strobe signal from the CPU 31. That is, the heat geneating elements are heated based on the outputted image data to the first temperature to turn the first ink layer red or to the second temperature to turn the second ink layer black.

The CPU 31 controls overall operation of the electronic board 1. The CPU 31 follows a predetermined control program to read image data from the sheet member 11 using the CIS 13 and store the retrieved image data in the RAM 35 while driving the sheet member feed motor 15 to move the sheet member 11 in a vertical direction. The CPU 31 also controls driving mode of the thermal head 21 and the sheet feed motor 23 based on the image data stored in the RAM 35, to reproduce on the heat-sensitive sheet the image that was drawn on the sheet member 11 in black or red marker. The ROM 33 stores the control program executed by the CPU 31 and also stores various types of control data. The RAM 35 stores image data retrieved by the CIS 13 and also functions as a work area for control processes of the CPU 31.

The ROM 33 stores the "characteristic values" of the electronic board 1 in the form of "a reference image signal level curve V1" and "a predetermined coefficient" for obtaining a threshold curve V0. The characteristic is a reference image signal level curve V1 obtained by correcting an image signal outputted by the CIS 13 when it reads a predetermined white reference member. The image signal is corrected so that its peak value matches a maximum value Vmax of the readable range defined in the image reading device. Then, the threshold level curve V0 can be provided by multiplying the curve V1 by the predetermined coefficient. When the electronic board 1 actually reads an image, the actual image signal level curve is compared with the threshold level curve V0, to produce an output of binary image data.

Next, a correction coefficient determination routine executed in the electronic board 1 for determining a correction coefficient will be described. The light receiving elements of the CIS 13 may degrade over time, so that the level of their output signal drops. Because of this, there is a need to compute a correction coefficient K for correcting the image signal V outputted from the CIS 13 when image data is actually retrieved.

Figure 3:
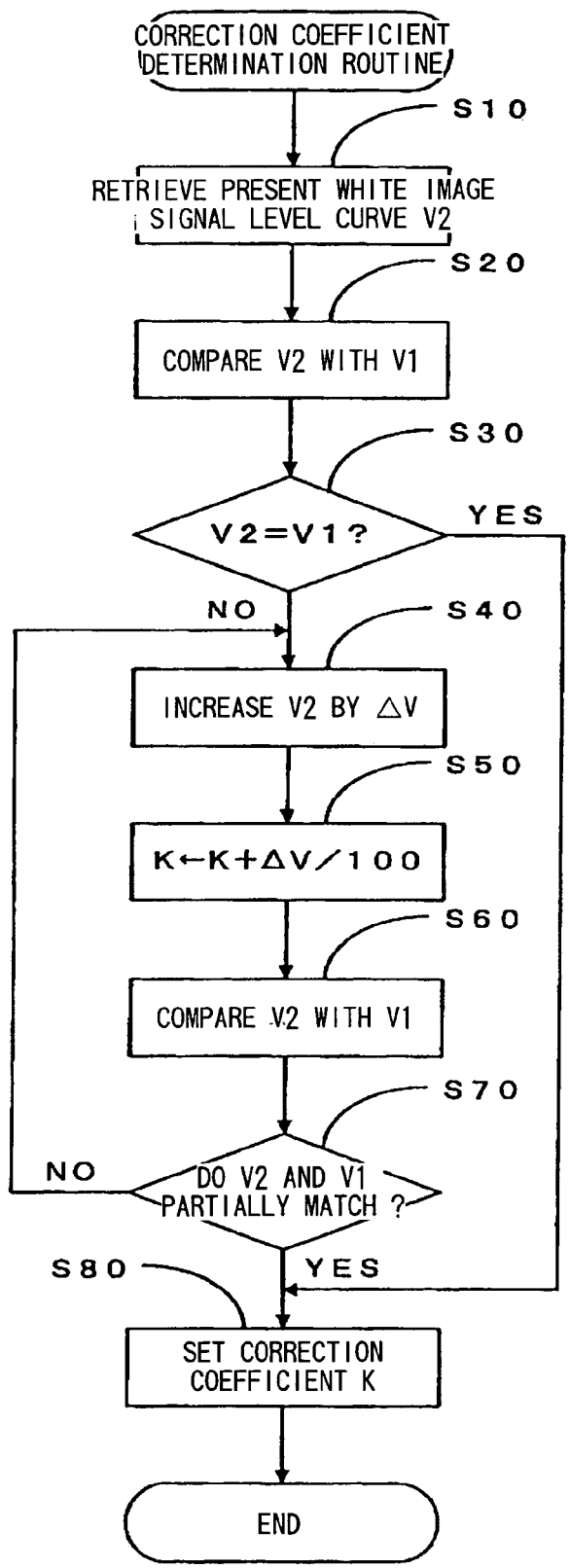
FIG. 3 is a flowchart representing a correction coefficient determination routine performed in the image reading device shown in FIG. 2.

FIG. 3 is a flowchart representing processes performed in the correction coefficient determination routine. First, an actual white image signal level curve V2 is retrieved in S10 using a surface of the sheet member 11 as a white reference surface where no image is drawn. Next, in S20 the actual white image signal level curve V2 is compared with the reference image signal level curve V1 stored in the ROM 33. Then, whether or not the two curves V1, V2 match each other is judged in S30. If not (S30:NO), then in S40 the actual white image signal level curve V2 is increased by a small amount $\Delta V$ (%), and in S50 a correction coefficient K is calculated based on the value of $\Delta V$ and stored in the RAM 35. That is, the correction coefficient K is first set to 1, and then increased in S50 to a value greater than 1 using the formula K $\Delta V/100$.

In S60, the present white image signal level curve V2 is again compared with the reference image signal level curve V1. Then it is judged whether or not at least a portion of the curves V1 and V2 match. If it is judged that there are no matching portions between curves V1 and V2 (S70:NO), then the routine returns to S40, whereupon the present white image signal level curve V2 is again increased by the small amount $\Delta V$(%) in S40, and the correction coefficient K is calculated in S50.

The processes of S40 to S70 are repeated until it is judged that at least a portion of the curves V1 and V2 match. It should be noted that the two curves V1 and V2 "match" implies that a part of the curve V2 overlaps with a part of the curve V1 within the range of plus minus $\Delta V1$(where $\Delta V1$ is a predetermined small amount) as a result of the successive change of the curve V2 by the step S50. When it is judged that a portion of the curves V1 and V2 match (S70:YES), then the correction coefficient K stored in the RAM 35 at this time is set in S80 as the coefficient to be multiplied by the output signal from the CIS 13 when an image is actually read.

Next, a correction coefficient determination routine will be described while referring to FIGS. 4(a) to 4(c). The ROM 33 stores therein, as the characteristic values of the electronic board 1, a reference signal level curve V1 and a predetermined coefficient. The reference signal level curve V1 is obtained by scanning a white reference member at the factory to obtain an image signal, and increasing the image signal until the peak value of the image signal matches the maximum readable value Vmax of the scanning range of the image reading device 1, whereupon the reference signal level curve V1 shown in FIG. 4(a) is set. The predetermined coefficient is used to obtain a threshold level curve V0 shown in FIG. 4(a) by multiplying the reference signal level curve V1 by the predetermined coefficient. The threshold level curve V0 is used to produce binary image data of an actual image signal level curve obtained when the electronic whiteboard 1 is actually used to read an image, that is, the threshold level curve V0 is compared with the actual image signal level curve to obtain the binary image data.

The correction coefficient determination routine is performed when the light receiving elements of the CIS 13 degrade over time, so that the output signal from the light receiving elements weakens. An image signal level curve V2 can be obtained, if the light receiving elements are degraded over time and if certain areas of the sheet member 11 are stained when the image of the sheet member 11 at the read position of the CIS 13 is read to perform the correction coefficient determination routine. The correction coefficient determination routine determines the correction coefficient K by increasing such an image signal level curve V2 by increments of the small amount $\Delta V$(%) until finally, as shown in FIG. 4(c), the image signal level curve V2 partially matches the reference image signal level curve V1.

Figure 4:
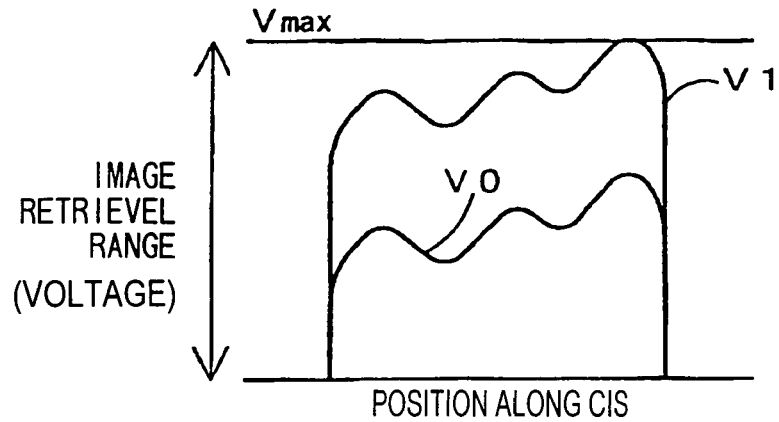
FIG. 4($a$) is a graph schematically showing a reference image signal level curve V1 and a threshold level curve V0, which serve as the characteristic of the image reading device shown in FIG. 2.
Figure 4:
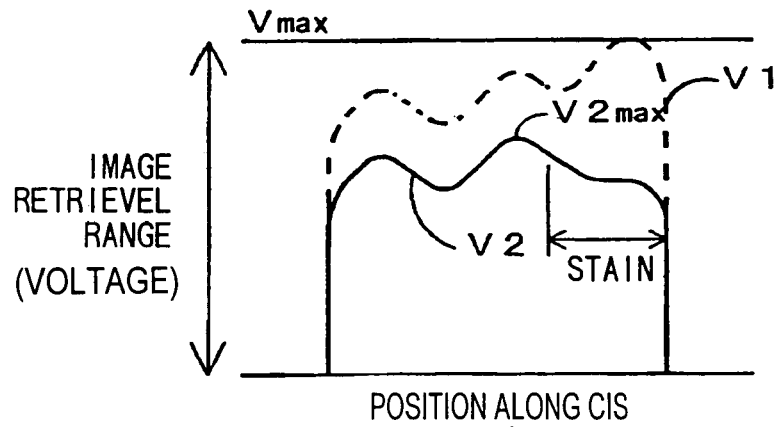
Figure 4:
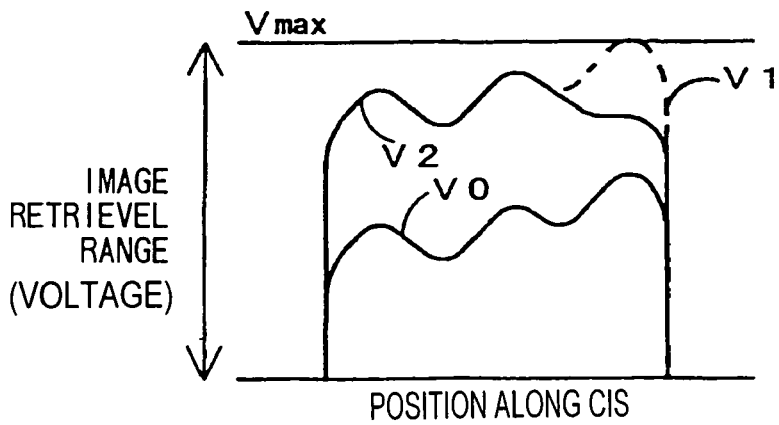

The correction coefficient determination routine enables proper determination of a correction coefficient that will reliably correct for weakening of the output signal from the light receiving elements of the CIS 13. Even if the sheet member 11 is partially stained as shown in FIG. 4(*b*) when its image is retrieved as a white reference, the correction coefficient can be properly determined without being affected by this stain.

When the correction coefficient K is determined in this way for the image signal level in the electronic board 1, then a copy routine is performed as shown in the flowchart of FIG. 5. First in S110 the CIS 13 reads the image, which was drawn on the surface of the sheet member 11 using a felt-tipped marker, while the sheet member feed motor 15 is driven to slowly move the sheet member 11 upward at a predetermined speed. In S120, the image signal level curve V2 that corresponds to the retrieved image data is multiplied by the correction coefficient K, and the resultant corrected image signal level curve K×V2 is stored in the RAM 35. In S130, sheet feed motor 23 of the thermal printer 5 is driven to set a heat-sensitive sheet at the printing position of the thermal printer 5.

In S140, the corrected image signal level curve K×V2 is compared with the threshold level curve V0, and in S150, a control signal for controlling the thermal printer 5 is produced. The control signal is produced by designating pixels in the corrected image signal level curve K×V2 that are equal to or less than the threshold level curve V0 as pixels that are to be colored. In S160, the control signal is outputted to the thermal printer 5 with a strobe signal.

In S170, it is judged whether or not a single page's worth of image data has been printed. If a single page's worth of image data has not been printed (S170:NO), then in S180 the sheet feed motor 23 is driven to feed the heat-sensitive sheet a single line's distance. The routine then returns to S140, whereupon the image signal level curve K×V2 of the next line is compared with the threshold level curve V0. A control signal for the next line is prepared in S150, and outputted to the thermal printer 5 along with the strobe signal in S160.

These processes are repeated until it is judged that a signal page's worth of image data has been printed (S170:YES), whereupon in S190 the sheet-feed motor 23 is driven to discharge the heat-sensitive sheet from the thermal printer 5. This ends the copy routine.

In this way, the degradation of the CIS 13 over time can be suitably corrected. Also, the correction coefficient used during this correction process can be properly calculated, even if the surface of the sheet member 11, which serves as the white reference member, is partially soiled. That is, the influence of the soiled portion can be removed during the correction process. Therefore, proper correction can always be performed. The image drawn on the sheet member 11 can be faithfully reproduced, without portions appearing blanched, because of the binary processing based on the corrected data.

While the invention has been described in detail and with reference to specific embodiment thereof, it would be apparent to those skilled in the art that various changes and modifications may be made therein without departing from the spirit and scope of the invention. For example, in the above described embodiment, a predetermined coefficient for obtaining the threshold level curve V0 is stored in the ROM 33. However, the entire threshold level curve V0 can be stored instead. Also, the depicted embodiment pertains to an electronic board. However, the present invention can be applied to a facsimile machine or other devices instead.

What is claimed is:

1. An image reading device comprising:
   an image reading unit comprising a plurality of optical reading sensors aligned in a row, the image reading unit outputting an image signal based on an image read by the plurality of optical reading sensors;
   a characteristic storage unit that stores the characteristic of the image reading unit in the form of a reference image signal level curve and one of a predetermined coefficient and a threshold level curve, the reference image signal level curve being obtained by correcting an image signal curve outputted by the reading unit when the optical reading sensors read an image of a predetermined white reference member at a factory so that a peak value of the image signal curve matches a predetermined maximum readable range, and the threshold level curve being obtained by multiplying the reference image signal level curve by the predetermined coefficient;
   a correction coefficient calculator that produces a corrected image signal level curve by incrementally increasing a correction coefficient until, when the present image signal level curve is multiplied by the correction coefficient, at least a part of the present image signal level curve matches a part of the reference signal level curve; and
   a correction output unit that produces a binary output signal of the corrected image signal level curve by comparing the corrected image signal level curve with either the threshold level curve stored in the characteristic storage unit or a threshold level curve obtained by multiplying the reference image signal level curve by the predetermined coefficient.

2. The image reading device as claimed in claim 1, wherein the correction coefficient calculator comprises:
   reading means that reads an image from a white reference surface provided at a reading position to obtain a pre-sent image signal level curve before image data is actually retrieved using the reading unit;
   comparing means that compares the present image signal level curve with the reference image signal level curve stored in the characteristic storage unit; and
   determining means that determines a correction coefficient required to match at least the portion of the present image signal level curve with the portion of the reference signal level curve.

3. The image reading device as claimed in claim 2, wherein the correction output unit comprises outputting means that outputs a corrected image signal level curve by multiplying the correction coefficient by the present signal level curve.

4. The image reading device as claimed in claim 1, wherein the plurality of optical image sensors comprise contact image sensors.

5. An electronic board comprising:
   a white board on which an image is drawn;
   an image reading unit comprising a plurality of optical reading sensors aligned in a row, the image reading unit outputting an image signal based on the image on the white board read by the plurality of optical reading sensors;
   a characteristic storage unit that stores the characteristic of the image reading unit in the form of a reference image signal level curve and one of a predetermined coefficient and a threshold level curve, the reference image signal level curve being obtained by correcting an image signal curve outputted by the reading unit when the optical reading sensors reads an image of a predetermined white reference member at a factory so that a peak value of the image signal curve matches a predetermined maximum readable range, and the threshold level curve being obtained by multiplying the reference image signal level curve by the predetermined coefficient;

a correction coefficient calculator that produces a corrected image signal level curve by incrementally increasing a correction coefficient until, when the present image signal level curve is multiplied by the correction coefficient, at least a part of the present image signal level curve matches a part of the reference signal level curve;

a correction output unit that produces a binary output signal of the corrected image signal level curve by comparing the corrected image signal level curve with either the threshold level curve stored in the characteristic storage unit or a threshold level curve obtained by multiplying the reference image signal level curve by the predetermined coefficient; and printing means that prints an image on an image recording medium based on the binary output signal.

6. The electronic board as claimed in claim 5, wherein the correction coefficient calculator comprises:

reading means that reads an image from a white reference surface provided at a reading position to obtain a present image signal level curve before image data is actually retrieved using the reading unit;

comparing means that compares the present image signal level curve with the reference image signal level curve stored in the characteristic storage unit; and determining means that determines a correction coefficient required to match at least the portion of the present image signal level curve with the portion of the reference signal level curve.

7. The electronic board as claimed in claim 5, wherein the correction output unit comprises outputting means that outputs a corrected image signal level curve by multiplying the correction coefficient by the present signal level curve.

8. The electronic board as claimed in claim 5, wherein the plurality of optical image sensors comprise contact image sensors.

9. The electronic board as claimed in claim 5, wherein the white board comprises:

an endless white sheet on which the image is to be drawn;

a pair of roller members rotatable about their axes for supporting and feeding the endless white sheet, the endless white sheet being mounted on the pair of roller members; and a drive motor drivingly connected to at least one of the roller members, the image reading unit being positioned in confrontation with one of the roller members.

10. A method for formulating a level of image signal comprising the steps of:

provisionally storing a characteristic of an image reading unit in the form of a reference image signal level curve and one of a predetermined coefficient and a threshold level curve, the reference image signal level curve being obtained by correcting an image signal curve outputted by the reading unit when the reading unit reads an image of a predetermined white reference member at a factory so that a peak value of the image signal curve matches a predetermined maximum readable range, and the threshold level curve being obtained by multiplying the reference image signal level curve by the predetermined coefficient;

producing a corrected image signal level curve by incrementally increasing a correction coefficient until, when the present image signal level curve is multiplied by the correction coefficient, at least a part of the present image signal level curve matches a part of the reference signal level curve; and generating a binary output signal of the corrected image signal level curve by comparing the corrected image signal level curve with either the threshold level curve stored in the characteristic storage unit or a threshold level curve obtained by multiplying the reference image signal level curve by the predetermined coefficient.

11. The method as claimed in claim 10, wherein the determining steps comprises the steps of:

reading an image from a white reference surface provided at a reading position to obtain a present image signal level curve before image data is actually retrieved using the reading unit;

comparing the present image signal level curve with the reference image signal level curve stored in the characteristic storage unit; and determining a correction coefficient required to match at least the portion of the present image signal level curve with the portion of the reference signal level curve.

12. The method as claimed in claim 10, wherein the generating step comprises outputting a corrected image signal level curve by multiplying the correction coefficient by the present signal level curve.

13. The method as claimed in claim 10 wherein the image reading unit comprises a plurality of optical reading sensors aligned in a row, the image reading unit outputting an image signal based on an image read by the plurality of optical reading sensors.

* * * * *